United States Patent
Stroemberg et al.

(10) Patent No.: US 9,889,516 B2
(45) Date of Patent: Feb. 13, 2018

(54) DEVICE FOR DISPENSING AND DISTRIBUTING FLUX-FREE SOLDER ON A SUBSTRATE

(71) Applicant: Besi Switzerland AG, Cham (CH)

(72) Inventors: Christoffer Stroemberg, Luzern (CH); Heinrich Berchtold, Luzern (CH); Charles Galea, Knonau (CH)

(73) Assignee: Besi Switzerland AG, Cham (CH)

( * ) Notice: Subject to any disclaimer, the term of this patent is extended or adjusted under 35 U.S.C. 154(b) by 0 days.

(21) Appl. No.: 14/323,420

(22) Filed: Jul. 3, 2014

(65) Prior Publication Data
US 2015/0008249 A1    Jan. 8, 2015

(30) Foreign Application Priority Data
Jul. 8, 2013    (CH) .................................... 1224/13

(51) Int. Cl.
*B23K 1/06*    (2006.01)
*B23K 3/06*    (2006.01)

(52) U.S. Cl.
CPC ............... *B23K 1/06* (2013.01); *B23K 3/063* (2013.01)

(58) Field of Classification Search
None
See application file for complete search history.

(56) References Cited

U.S. PATENT DOCUMENTS

| | | | | |
|---|---|---|---|---|
| 2,754,395 A | * | 7/1956 | Scheller | B23K 9/291 219/137.44 |
| 2,761,049 A | * | 8/1956 | Mcelrath | B23K 9/285 219/137.52 |
| 3,112,392 A | * | 11/1963 | Orr | B23K 9/173 219/137.42 |
| 3,674,914 A | * | 7/1972 | Burr | H01L 24/78 156/166 |

(Continued)

FOREIGN PATENT DOCUMENTS

| | | |
|---|---|---|
| CN | 1443622 A | 9/2003 |
| CN | 101185986 A | 5/2008 |

(Continued)

OTHER PUBLICATIONS

Search Report in Singapore Application No. 10201402540Y, dated Oct. 31, 2016.

(Continued)

*Primary Examiner* — Devang R Patel
(74) *Attorney, Agent, or Firm* — Nixon Peabody LLP

(57) ABSTRACT

A device for dispensing and distributing flux-free solder on a substrate comprises an elongated tool, a tool mount, an ultrasonic generator, a wire guide tube, and optionally a heat sink and a housing. The tool can be fixed to the tool mount and has a longitudinal borehole which opens into an opening on the tip of the tool. The wire guide tube extends along a central longitudinal axis through the ultrasonic generator and the tool mount, protrudes into the longitudinal borehole of the tool and reaches up to a position above the tip of the (Continued)

Figure 1:
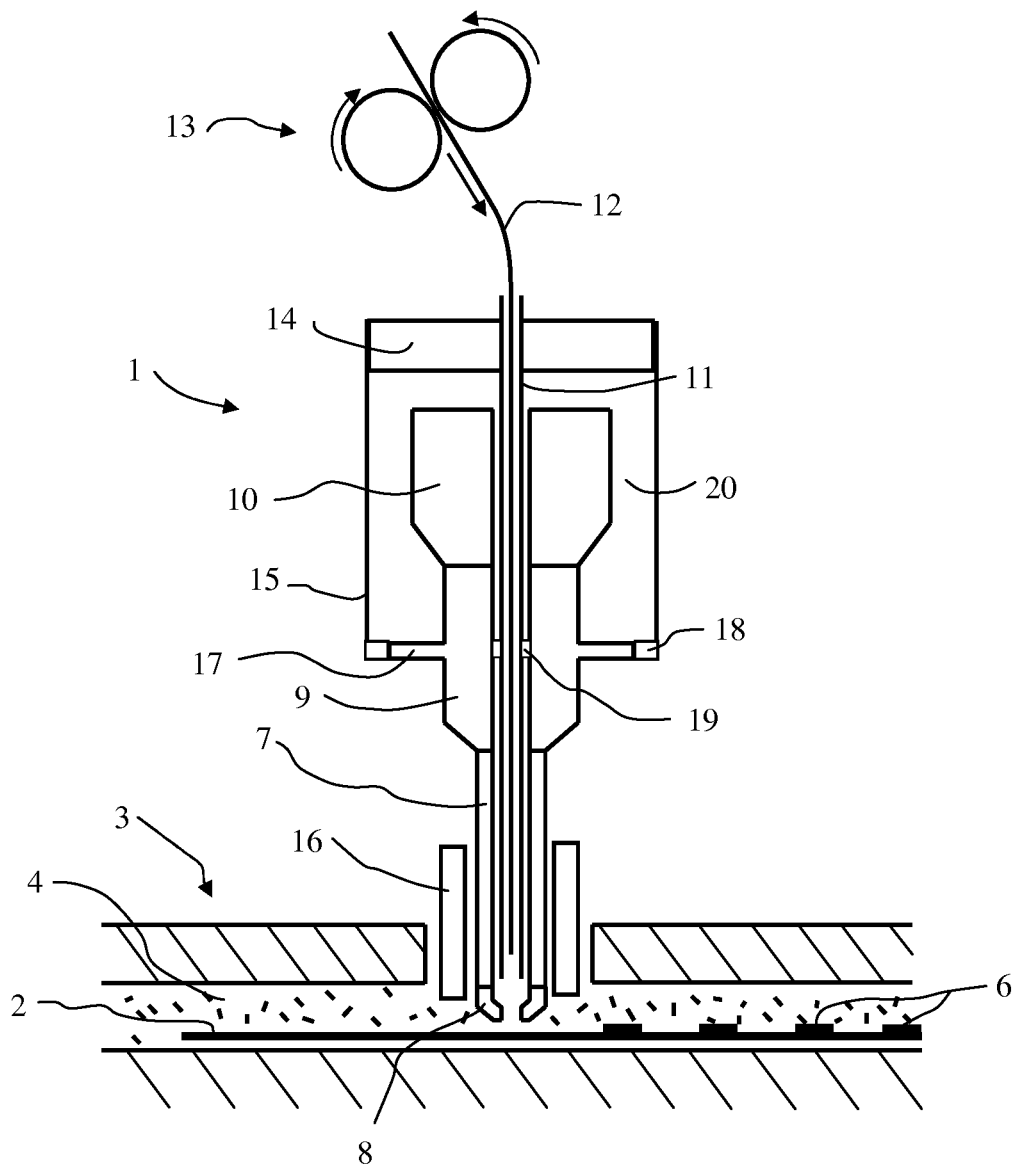

tool. The wire guide tube does not touch the tool. The ultrasonic generator is fixed to the tool mount. Advantageously, a cooling chamber which can actively be cooled is formed between an inner wall of the housing and the ultrasonic generator.

20 Claims, 1 Drawing Sheet

(56) References Cited

U.S. PATENT DOCUMENTS

| | | | |
|---|---|---|---|
| 4,577,398 A | 3/1986 | Sliwa et al. | |
| 4,709,849 A | 12/1987 | Socolowski | |
| 4,934,309 A * | 6/1990 | Ledermann | B23K 3/06 118/410 |
| 4,998,002 A | 3/1991 | Okikawa et al. | |
| 5,201,453 A * | 4/1993 | Amador | B23K 20/007 228/1.1 |
| 5,421,504 A * | 6/1995 | Spirig | B23K 3/02 226/158 |
| 5,667,130 A | 9/1997 | Morita et al. | |
| 5,783,008 A * | 7/1998 | Belke, Jr. | B60R 16/0207 156/298 |
| 5,878,939 A * | 3/1999 | Luchinger | B23K 3/0607 222/592 |
| 6,056,184 A | 5/2000 | Luchinger et al. | |
| 6,180,891 B1 * | 1/2001 | Murdeshwar | B23K 20/005 174/260 |
| 8,646,675 B2 * | 2/2014 | Lang | B23K 20/005 228/180.5 |
| 2003/0168498 A1 * | 9/2003 | Suter | B23K 1/0016 228/256 |
| 2003/0168938 A1 | 9/2003 | Wallaschek et al. | |
| 2004/0035907 A1 * | 2/2004 | Radeck | B23K 3/0607 228/41 |
| 2009/0145950 A1 | 6/2009 | Lam et al. | |
| 2012/0298730 A1 * | 11/2012 | Berchtold | H01L 24/27 228/262 |

FOREIGN PATENT DOCUMENTS

| | | |
|---|---|---|
| CN | 101452865 A | 6/2009 |
| JP | 7-326619 A | 12/1995 |
| JP | 2000-269630 A | 9/2000 |
| JP | 2004-214354 A | 7/2004 |
| JP | 2004-356241 | 12/2004 |
| JP | 2009-248111 | 10/2009 |
| JP | 2012-45599 A | 3/2012 |
| WO | 03/081644 | 10/2003 |

OTHER PUBLICATIONS

Search Report in Chinese Application No. 201410322893.1, dated Feb. 4, 2017.
Preliminary Search Report in French Application No. 1456280, dated Sep. 29, 2017.

* cited by examiner

DEVICE FOR DISPENSING AND DISTRIBUTING FLUX-FREE SOLDER ON A SUBSTRATE

PRIORITY CLAIM

Applicant hereby claims foreign priority under 35 U.S.C § 119 from Swiss Patent Application No. 1224/13 filed Jul. 8, 2013, the disclosure of which is herein incorporated by reference.

FIELD OF THE INVENTION

The invention relates to a device for dispensing and distributing flux-free solder on a substrate.

BACKGROUND OF THE INVENTION

Soldering methods of this kind are typically but not exclusively used in the mounting of semiconductor chips on a metallic substrate, a so-called leadframe. Power semiconductors are usually mainly connected by means of soft soldering with the substrate, which usually consists of copper, in order to ensure a more effective dissipation of the heat losses from the semiconductor chip via the soldered joint in comparison with mounting by means of an adhesive. High requirements are placed on the homogeneity of the soldered joint, especially in the case of increased power density, i.e. a defined thickness, even distribution and perfect wetting of the solder layer over the entire chip area as well as complete freedom from bubbles and purity of the soldered joint are demanded. On the other hand, the solder should not escape laterally from the soldering gap and spread next to the semiconductor chip, which again requires precise dosing and positioning of the solder portions.

In the field of mounting semiconductor chips a method is widely spread in practical use in which the end of a solder wire is brought into contact with the substrate that his heated over the melting temperature of the solder in order to melt down a piece of the wire. This method is generally well suited for mass production due to its simplicity and flexibility. However, the obtained approximately circular wetting surface is badly adapted to the rectangular or square shape of the semiconductor chips. A punching die is further known from U.S. Pat. No. 6,056,184 with which the portion of solder deposited on the substrate can be brought into a flat shape which is adjusted to the rectangular shape of the semiconductor chips. It is also known to move the end of the soldering metal wire with a writing head along a specific path, with the heated substrate continuously melting down the solder. A track of solder is thereby deposited on the substrate.

From U.S. Pat. No. 5,878,939 a method is known in which liquid solder is injected into a cavity formed between a molding die and the substrate.

These known methods come with a number of disadvantages. The shape of the deposited solder is either round or a specific punching die needs to be produced for every rectangular shape. Such a punching die comprises side walls which cover a part of the substrate. The solder can therefore not be applied up to the edge of the chip island which accommodates the semiconductor chip. Moreover, the substrate needs to be heated up over the melting temperature of the solder and the deposited solder needs to be kept in liquid form from the application until the placement of the semiconductor chip. It is also disadvantageous that the parts that come into contact with the liquid solder need to be cleaned regularly, for which purpose production needs to be interrupted.

From U.S. Pat. No. 4,577,398 and U.S. Pat. No. 4,709,849 a method is known in which flat preforms made of soldering metal (so-called "solder preforms") are prefabricated, the dimensions of which are adjusted to the semiconductor chips. The solder preforms are then placed on the substrate and molten down by the same in order to form a soldering layer in the required dimensions. This method is relatively expensive and offers little flexibility due to the required prefabrication of the solder preforms and the additional mounting operations.

From US 2009-145950 a method and apparatus are known in which a solder wire is guided through the writing head of a solder dispenser, with the wire being brought into contact with the heated substrate when applying the solder, so that the solder will melt at the end of the wire, and with the writing head being moved along a predetermined path parallel to the surface of the substrate. The solder dispenser writes a solder track in this manner on the substrate. It is disadvantageous in this method that the substrate can only be wetted insufficiently without preceding cleaning.

From US 2012-0298730 a method for dispensing and distributing solder is known, in which a solder portion is applied to the substrate in a first step and the solder portion is distributed on the substrate in a second step by means of a pin to which ultrasonic sound can be applied.

The dispensing and distributing of flux-free solder on a substrate is influenced by various factors such as impurities and oxide layers on the surface of the substrate, chemical processes between the tools which are used for dispensing or distributing, respectively, and the solder, which makes dispensing and distributing a difficult task.

SUMMARY OF THE INVENTION

The invention is based on the object of dispensing a precisely metered solder portion in perfect quality onto a substrate.

According to the invention a device for dispensing and distributing flux-free solder on a substrate comprises
  an elongated tool with a tip with an opening and with a longitudinal borehole which opens into the opening on the tip of the tool;
  a tool mount with a longitudinal borehole;
  an ultrasonic generator with a longitudinal borehole which is fixed to the tool mount, and a wire guide tube;
  wherein the tool can be fixed to the tool mount in such a way and the ultrasonic generator is fixed to the tool mount in such a way that their longitudinal boreholes are in alignment with each other, and wherein the wire guide tube extends through the longitudinal boreholes of the ultrasonic generator and the tool mount, protrudes into the longitudinal borehole of the tool up to a position above the tip of the tool and does not touch the tool.

The tool mount may comprise an extension in which the wire guide tube bears. The extension is preferably arranged in a node of the ultrasonic waves generated by the ultrasonic generator.

A cooling chamber which can actively be cooled may be formed between an inner wall of the housing and the ultrasonic generator.

A heat sink may be fixed to the wire guide tube.

The device can be mounted to a writing head which is movable in three spatial directions, and a heating and cooling device, through which the bottom part of the tool protrudes, may be used for keeping the temperature of the tip of the tool within a predetermined temperature window.

BRIEF DESCRIPTION OF THE DRAWING FIGURES

Figure 2:
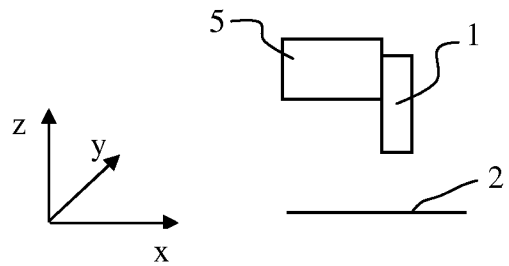

The accompanying drawings, which are incorporated into and constitute a part of this specification, illustrate one or more embodiments of the present invention and, together with the detailed description, serve to explain the principles and implementations of the invention. The figures are not to scale. In the drawings:

FIG. 1 shows a device for dispensing and distributing flux-free solder on a substrate in accordance with the invention, and FIG. 2 shows a writing head with such a device.

DETAILED DESCRIPTION OF THE INVENTION

FIG. 1 shows a device 1 for dispensing and distributing flux-free solder on a substrate 2 in accordance with the invention. The substrates 2 are conveyed in a predetermined transport direction through a furnace 3, in which there is usually a protective gas atmosphere. The protective gas 4 is $H_2N_2$ for example. As is shown in FIG. 2, the device 1 is fixed to a writing head 5 which can be moved by drives (not shown) in two directions X and Y extending in a planar manner in relation to the plane of the substrates 2 and can be lifted and lowered in a direction Z extending perpendicularly to the plane of the substrates 2. The writing head 5 is moved along a predetermined path during and/or after the delivery of the solder in order to distribute the solder as a solder portion 6 on the substrate 2. The device 1 comprises an elongated tool 7 with a tip 8 which is provided with an opening, a tool mount 9, an ultrasonic generator 10 and a wire guide tube 11. The tip 8 of the tool 7 can be an integral component of the tool 7 or a separate part which is fixed to the tool 7 and which is releasable and therefore exchangeable. The solder is supplied in form of a solder wire 12. The solder wire is usually wound up on a wire coil and is supplied by a wire feed device 13 to the wire guide tube 11. The device 1 further optionally comprises a heat sink 14 and a housing 15. The bottom part of the tool 7 protrudes through a heating and cooling device 16, which is used to hold the temperature of the tip 8 of the tool 7 within a predetermined temperature window. The wire feed device 13 and the heating and cooling device 16 are preferably fixed to the writing head 5, but can also be fixed to a base 18 of the device 1.

The tool 7 has a longitudinal borehole which opens into the opening on the tip 8 of the tool 7. The tool 7 is fixed to the tool mount 9, which occurs advantageously in a releasable and therefore exchangeable manner. The ultrasonic generator 10 is fixed to the tool mount 9, namely on the side opposite of the tool 7. The tool mount 9 is at the same time formed as an oscillating body and transmits the ultrasonic waves generated by the ultrasonic generator 10 to the tool 7.

The tool mount 9 and the ultrasonic generator 10 comprise a borehole, which in this case are designated as longitudinal boreholes, because they are arranged along a central longitudinal axis of the device. The longitudinal boreholes of the tool 7, the tool mount 9 and the ultrasonic generator 10 extend along the central longitudinal axis, i.e. they are in alignment with each other, and the wire guide tube 11 extends along the central longitudinal axis through the longitudinal boreholes of the ultrasonic generator 10, the tool mount 9 and the tool 7, protrudes into the longitudinal borehole of the tool 7 and reaches up to a position above the tip 8 of the tool 7 without touching the tool 7. The ultrasonic waves generated by the ultrasonic generator 10 are longitudinal waves extending along the central longitudinal axis.

The tool mount 9 is preferably arranged with a flange 17 which is arranged in a node of the ultrasonic waves and is fixed via the flange 17 to the base 18 of the device 1. The base 18 is configured for fixing to the writing head 5 (FIG. 2).

The temperature of the wire guide tube 11 must lie beneath the melting temperature of the solder, so that the solder wire guided through the wire guide 11 does not melt and remains sufficiently stiff, so that precisely defined solder portions can be supplied to the substrate 2. In order to fulfil this task, the wire guide tube 11 is principally fixed, i.e. directly or indirectly, to the base 18 in such a way that it does not touch the ultrasonic generator 10 and the tool 7, and preferably also does not touch the tool mount 9. In the illustrated embodiment, the wire guide tube 11 is fixed to the heat sink 14, the heat sink 14 to the housing 15, and the housing 15 to the base 18. In order to increase the stability of the position of the wire guide tube 11, the longitudinal borehole of the tool mount 9 can be provided with an extension 19 which is annular for example, and the wire guide tube 11 bears radially in said extension 19. The extension 19 is advantageously situated in a node of the ultrasonic waves generated by the ultrasonic generator 10 in order to prevent that ultrasonic energy is transmitted to the wire guide tube 11 which would be converted there into heat. The bearing of the wire guide tube 11 in the extension 19 is preferably provided with a little play, so that the contact area where the wire guide tube 11 and the extension 19 touch each other is as small as possible in order to minimize the transmission of heat and also of ultrasonic energy.

Further possibilities in order to keep the temperature of the wire guide tube 11 beneath the melting temperature of the solder wire are as follows:

The use of a heat sink 14 which is fixed to the wire guide tube 11 in the region of the wire feed. The heat sink 14 is used for cooling the wire guide tube 11 and for maintaining the same at a temperature over its entire length which lies beneath the melting temperature of the solder wire 12. The heat sink 14 and the wire guide tube 11 are therefore connected to each other in a thermally well-conducting manner. The heat sink 14 can be actively cooled, e.g. by supplying a cooling gas or by means of Peltier elements which pump heat from the heat sink 14 to the ambient environment, or by other means.

The use of a housing 15 which is formed in such a way that a cooling chamber 20 is formed between the inner wall of the housing 15 and the ultrasonic generator 10, which cooling chamber is actively cooled, e.g. by supplying a cooling gas or by other means such as for example Peltier elements. The housing 15 is fixed to the base 18. The cooling gas is preferably provided by a cooling apparatus and supplied to and discharged from the cooling chamber 20 in a closed circuit. The housing 15 is provided with an inlet and an outlet for this purpose. The cooling of the cooling chamber 20 is made in such a way that the temperature in the cooling chamber 20 is sufficiently low in order to ensure smooth operation of the piezo elements of the ultrasonic generator 10. The wire guide tube 11 extends partly through the cooling chamber 20 and is thus also cooled.

The tool mount 9 can be provided with cooling ribs in order to support the cooling of the wire guide tube 11 and the ultrasonic generator 10.

The wire guide tube 11 consists of a material that can be wetted only with difficulty by a flux-free solder. Ceramic material is an especially suitable material for the wire guide tube 11, but also stainless steel. The tool 7 consists of a material which conducts ultrasonic sound very well such as stainless steel or titanium which can be used in pure form or with mostly minor alloy agents of aluminium, vanadium, manganese, molybdenum, palladium, copper, zirconium and/or tin. The tip 8 of the tool 7 has a working area which encloses the opening and which is opposite of the substrate 2 and consists of a material which can be wetted very well with a flux-free solder or is coated with such a material. In certain processes, the working area touches the substrate 2 during the application and/or distribution of the solder, but not in other processes. Materials which are wetted comparatively well by flux-free solder are copper and copper alloys such as bronze, brass etc, or also mainly silver-containing alloys, i.e. an alloy of silver and minor alloy agents such as for example sterling silver, or even gold with minor alloy agents. Brass is available in various variants, of which CuZn37 or CuZn38Pb2 are typical representatives. Apart from the working area, the outside of the elongated tool 7 can be coated at least in the region of the tip 8 by a material which cannot be wetted well by a flux-free solder such as for example chromium.

The delivery of the solder to the substrate occurs in such a way that the solder wire 12 is advanced by a predetermined length $L_1$, so that it touches the substrate 2 and its tip melts, and is then retracted by a predetermined shorter length $L_2$. The difference in the lengths defines the supplied solder quantity.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

The invention claimed is:

1. An apparatus comprising:
  a writing head which is movable in three spatial directions, the writing head configured to receive a device configured to dispense and distribute flux-free solder on a substrate, the device configured to dispense and distribute flux-free solder comprising
  an elongated tool with a tip with an opening and with a longitudinal borehole which opens into the opening of the tip of the tool,
  a tool mount with a longitudinal borehole which is provided with an annular extension,
  an ultrasonic generator with a longitudinal borehole, and
  a wire guide tube that bears radially in said extension, wherein
  the ultrasonic generator is fixed to the tool mount and configured to generate ultrasonic waves,
  the tool mount is formed as an oscillating body transmitting the ultrasonic waves generated by the ultrasonic generator to the tool,
  the tool mount is configured to fix the tool, the longitudinal boreholes of the tool mount,
  the ultrasonic generator and the tool are in alignment with each other, and
  the wire guide tube extends through the longitudinal boreholes of the ultrasonic generator and the tool mount, protrudes into the longitudinal borehole of the tool up to a position above the tip of the tool and does not touch the tool.

2. The apparatus of claim 1, wherein said extension is arranged in a node of the ultrasonic waves generated by the ultrasonic generator.

3. The apparatus of claim 1, further comprising a housing and a cooling chamber formed between an inner wall of the housing and the ultrasonic generator, the cooling chamber configured to actively be cooled.

4. The apparatus of claim 1, further comprising a housing and a cooling chamber formed between an inner wall of the housing and the ultrasonic generator, the cooling chamber configured to actively be cooled.

5. The apparatus of claim 2, further comprising a housing and a cooling chamber formed between an inner wall of the housing and the ultrasonic generator, the cooling chamber configured to actively be cooled.

6. The apparatus of claim 1, further comprising a heat sink which is fixed to the wire guide tube.

7. The apparatus of claim 1, further comprising a heat sink which is fixed to the wire guide tube.

8. The apparatus of claim 2, further comprising a heat sink which is fixed to the wire guide tube.

9. The apparatus of claim 3, further comprising a heat sink which is fixed to the wire guide tube.

10. The apparatus of claim 5, further comprising a heat sink which is fixed to the wire guide tube.

11. The apparatus of claim 1, further comprising a heating and cooling device, through which a bottom part of the tool protrudes, wherein the heating and cooling device is configured to keep a temperature of the tip of the tool within a predetermined temperature window.

12. The apparatus of claim 1, further comprising a heating and cooling device, through which a bottom part of the tool protrudes, wherein the heating and cooling device is configured to keep a temperature of the tip of the tool within a predetermined temperature window.

13. The apparatus of claim 2, further comprising a heating and cooling device, through which a bottom part of the tool protrudes, wherein the heating and cooling device is configured to keep a temperature of the tip of the tool within a predetermined temperature window.

14. The apparatus of claim 3, further comprising a heating and cooling device, through which a bottom part of the tool protrudes, wherein the heating and cooling device is configured to keep a temperature of the tip of the tool within a predetermined temperature window.

15. The apparatus of claim 4, further comprising a heating and cooling device, through which a bottom part of the tool protrudes, wherein the heating and cooling device is configured to keep a temperature of the tip of the tool within a predetermined temperature window.

16. The apparatus of claim 5, further comprising a heating and cooling device, through which a bottom part of the tool protrudes, wherein the heating and cooling device is configured to keep a temperature of the tip of the tool within a predetermined temperature window.

17. The apparatus of claim 6, further comprising a heating and cooling device, through which a bottom part of the tool protrudes, wherein the heating and cooling device is configured to keep a temperature of the tip of the tool within a predetermined temperature window.

18. The apparatus of claim 7, further comprising a heating and cooling device, through which a bottom part of the tool protrudes, wherein the heating and cooling device is configured to keep a temperature of the tip of the tool within a predetermined temperature window.

19. The apparatus of claim 8, further comprising a heating and cooling device, through which a bottom part of the tool protrudes, wherein the heating and cooling device is configured to keep a temperature of the tip of the tool within a predetermined temperature window.

20. The apparatus of claim 9, further comprising a heating and cooling device, through which a bottom part of the tool protrudes, wherein the heating and cooling device is configured to keep a temperature of the tip of the tool within a predetermined temperature window.

* * * * *